Jan. 23, 1968   R. R. HICKERSON   3,364,810
SURVEYOR'S AUTOMATIC LEVEL
Filed Feb. 24, 1964   4 Sheets-Sheet 1

INVENTOR.
Robert R. Hickerson,
BY
Lockwood, Woodard, Smith & Weikart
Attorneys.

INVENTOR.
Robert R. Hickerson,
BY
Lockwood, Woodard, Smith & Weikart
Attorneys.

Jan. 23, 1968 R. R. HICKERSON 3,364,810
SURVEYOR'S AUTOMATIC LEVEL
Filed Feb. 24, 1964 4 Sheets-Sheet 3
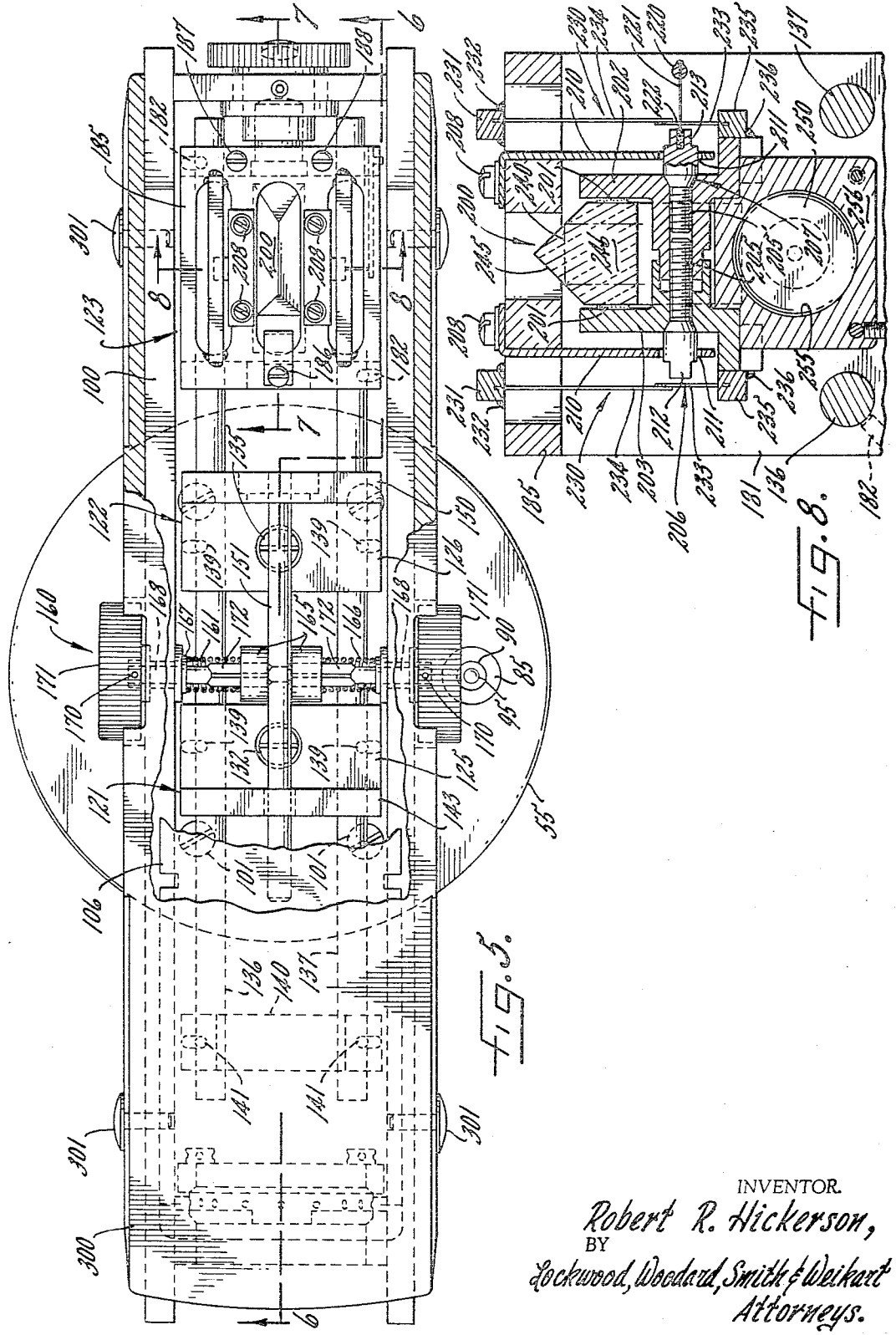
INVENTOR.
Robert R. Hickerson,
BY
Lockwood, Woodard, Smith & Weikart
Attorneys.

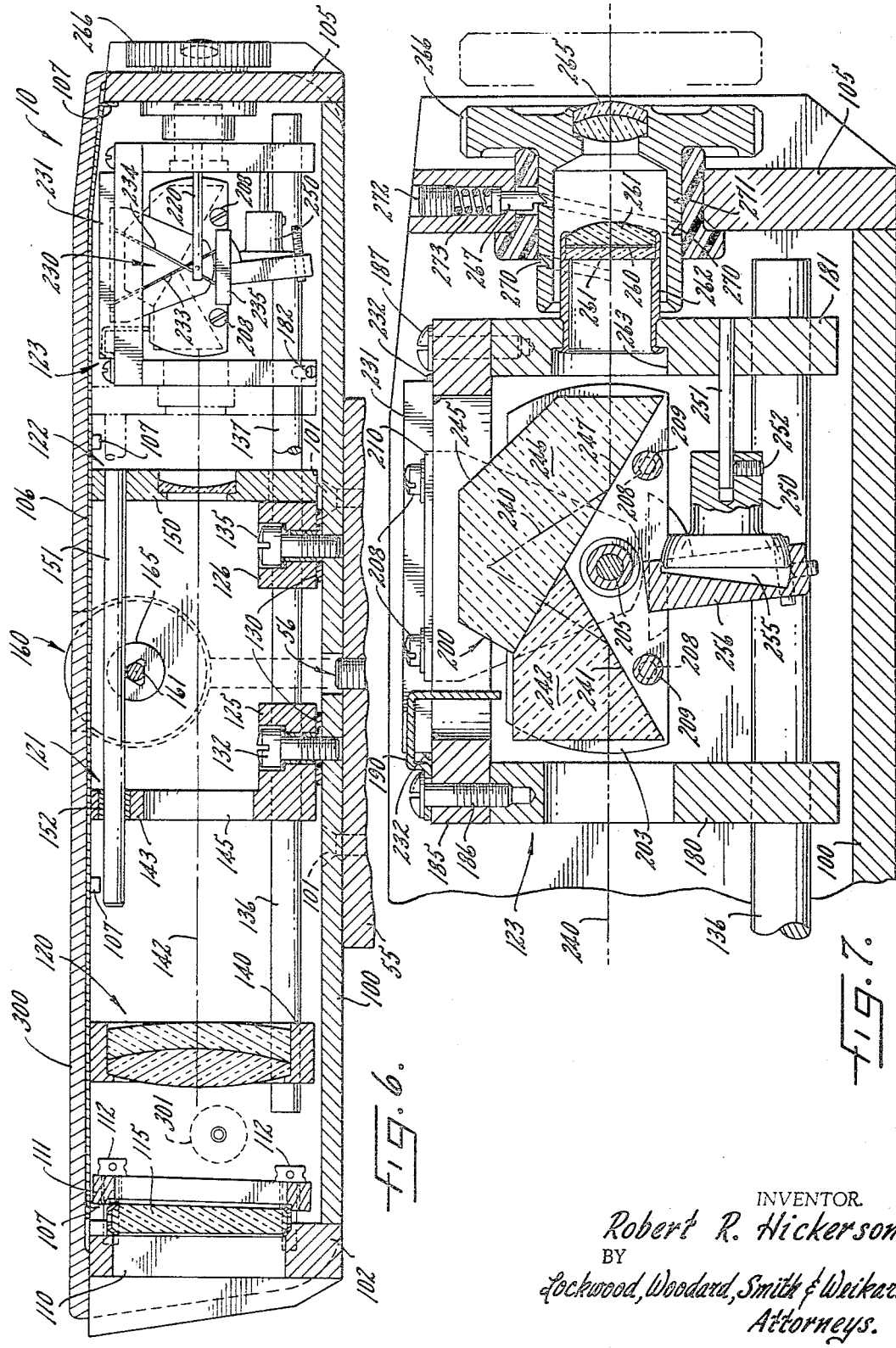

United States Patent Office 3,364,810
Patented Jan. 23, 1968

3,364,810
SURVEYOR'S AUTOMATIC LEVEL
Robert R. Hickerson, Indianapolis, Ind., assignor to Hickerson Instrument Co., Inc., Indianapolis, Ind., a corporation of Indiana
Filed Feb. 24, 1964, Ser. No. 346,909
7 Claims. (Cl. 88—1)

The present invention relates to an improved automatic level.

Anyone who has used the standard dumpy level is aware of the problems involved in adjusting and maintaining the level telescope in a condition of horizontal line of sight. Usually a generally cylindrical bubble vial is provided with a horizontal axis parallel to the telescope. Four knurled headed elements on the dumpy level must be adjusted both initially and during the use of the level to maintain it in level condition. Such adjustment is time consuming and may not be properly performed by an inexperienced surveyor causing inaccurate readings and possibly damaging the instrument. Also, the surveyor may not check the bubbles often enough so that the dumpy level may be out of adjustment at the time of taking one or more readings.

Consequently, a primary object of the invention is to provide an improved level capable of being quickly and accurately adjusted to a horizontal line of sight and capable of automatically maintaining said horizontal line of sight.

Still another object of the invention is to provide a level incorporating improved means for bringing the level into adjustment.

Another object of the invention is to provide an automatic level which is relatively shock resistant whereby shocks and jolts do not damage the level.

A further object of the invention is to provide an automatic level which is capable of maintaining itself in adjustment even though subjected to shocks and jolts.

Related objects and advantages will appear as the description proceeds.

The full nature of the invention will be understood from the accompanying drawings and the following description and claims.

FIG. 5 is a top plan view of the automatic level of the present invention.

FIG. 6 is a vertical section taken along the line 6—6 of FIG. 5 in the direction of the arrows.

FIG. 7 is an enlarged vertical section taken along the line 7—7 of FIG. 5 in the direction of the arrows.

FIG. 8 is an enlarged vertical transverse section taken along the lines 8—8 of FIG. 5 in the direction of the arrows.

Figure 1:
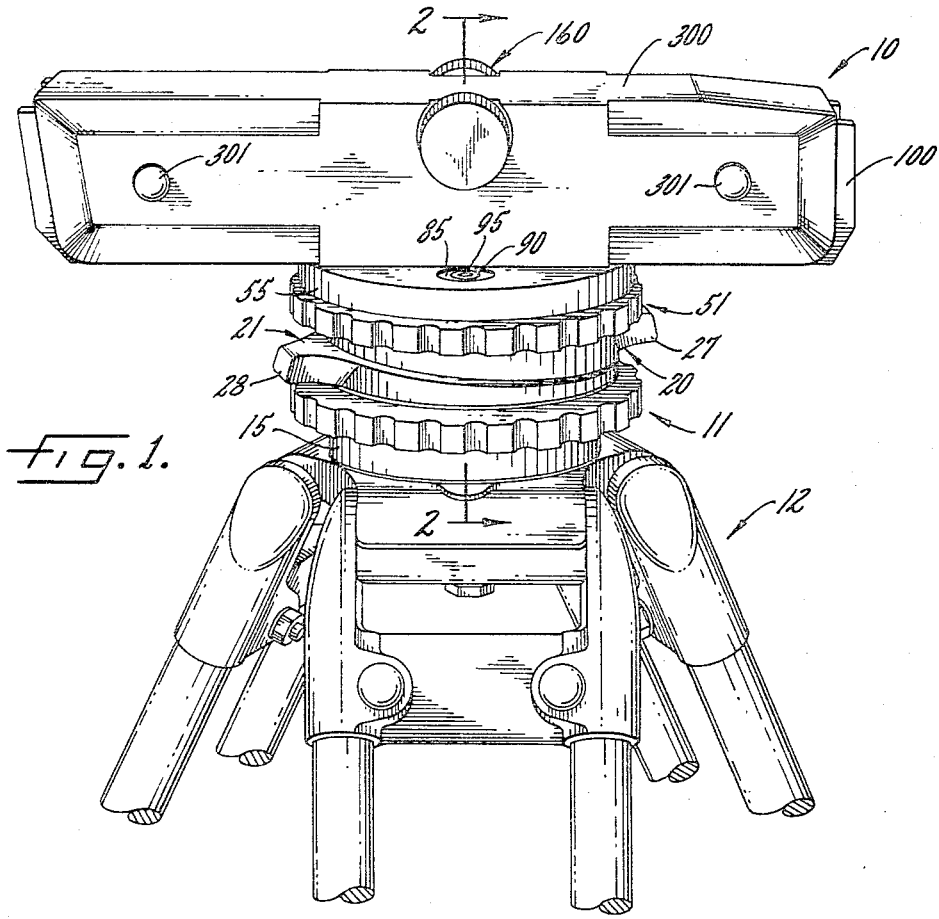
FIG. 1 is a fragmentary side elevation of an automatic level embodying the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated in FIG. 1 an automatic level which includes an upper telescope portion 10 including automatic compensating means described in detail below for bringing the line of sight of the telescope to a level condition within given limits. The automatic level further includes a rough or coarse leveling assembly 11 which mounts the telescope portion 10 upon a suitable tripod 12 and which provides means for bringing the telescope portion 10 within the given limits of its operation.

Figure 2:
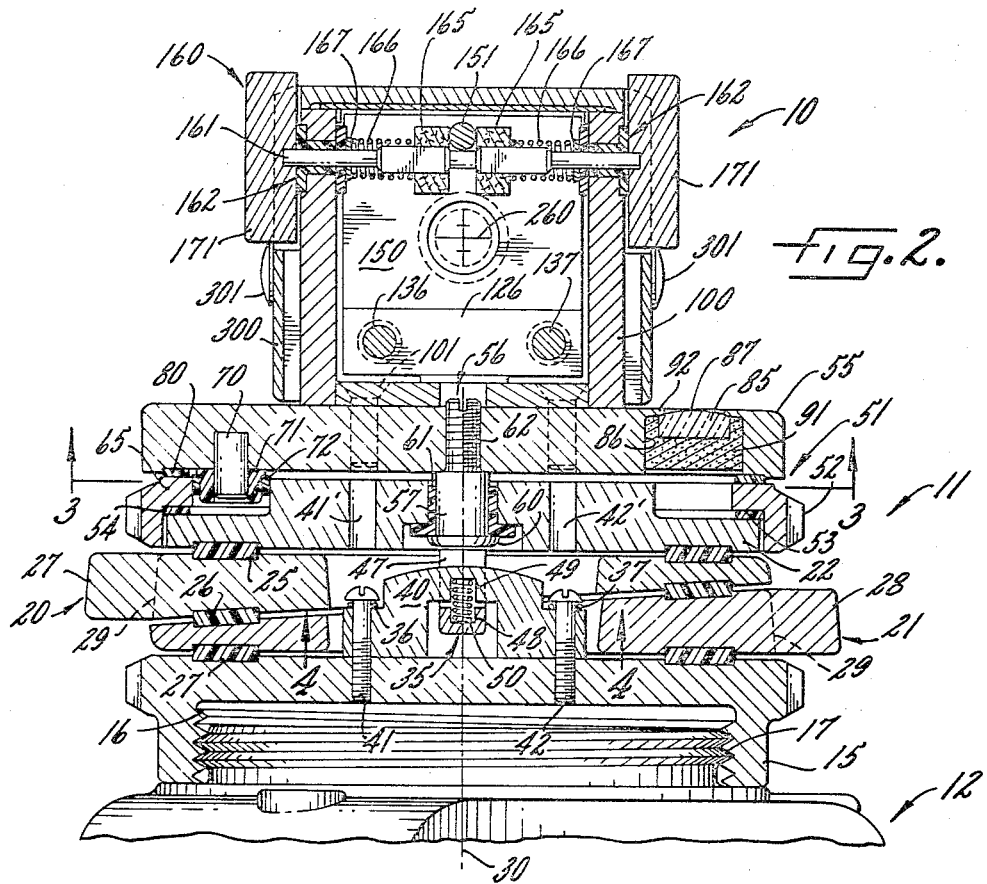
FIG. 2 is an enlarged vertical section taken along the line 2—2 of FIG. 1 in the direction of the arrows.

Referring to FIG. 2, the coarse leveling assembly 11 is shown in section as including a base bottom plate 15, said plate having an internal threaded portion 16 which is threaded upon the upstanding threads 17 of the tripod assembly 12. A pair of wedges 20 and 21 are received between the base bottom plate 15 and a base hub plate 22 and are guided for smooth, relatively friction-free rotation about a common axis relative to one another and relative to the plates 15 and 22 by means of a plurality of annular Teflon bearings 25, 26 and 27. The bearings 25, 26 and 27 are received within suitable coaxial annular recesses in the upper face of the bottom plate 15 and in the lower face of the hub plate 22 and in both upper and lower faces of the wedges 20 and 21.

Figure 4:
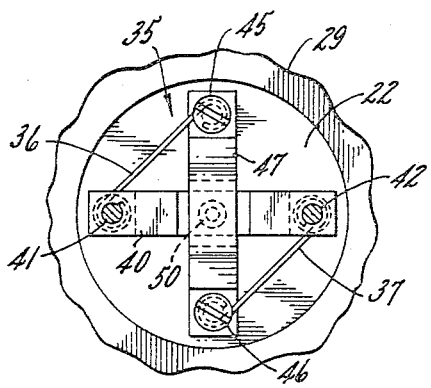
FIG. 4 is a horizontal section taken along the line 4—4 of FIG. 2 in the direction of the arrows.

Each of the wedges 20 and 21 has a generally circular or part-spherical external configuration 29 interrupted only by a single outwardly projecting knob 27 and 28 by which the respective wedge is rotated about the common axis 30. It can be appreciated that by relative rotation of the wedges 20 and 21 with respect to one another and with respect to the bottom plate 15, the hub plate 22 can be adjusted to any desired tilt or attitude. The hub plates 22, however, is retained against rotation relative to the bottom plate 15 by an interlocking bridge means 35 and by stabilizer springs 36 and 37 (see FIG. 4).

The interlocking bridge means 35 includes a first bridge 40 which is securely attached to the bottom plate 15 by means of screws 41 and 42. One end of each of the springs 36 and 37 is received between the head of the respective screws 41 and 42 and the bridge 40. It is thus fixed relative to the bridge 40 and the bottom plate 15. The other end of each stabilizer spring 36 and 37 is received beneath the heads of screws 45 and 46, respectively, which also fix the bridge 47 to the lower surface of the hub plate 22. The screws 41 and 42 can be reached with a screwdriver through the cylindrical apertures 41' and 42' in the hub plate 22.

A compression spring 50 is received between the bridges 40 and 47 within suitable cylindrical apertures 48 and 49 and urges the bridges apart, thus also urging the hub plate 22 toward the bottom plate 15 and firmly retaining the hub plate seated against the annular Teflon bearing 25 and holding the wedges 20 and 21 and bearings 25, 26 and 27 tightly together. It can be appreciated that the stabilizer springs 36 and 37 permit the hub plate 22 to tilt at various angles relative to the bottom plate 15 but that the springs 36 and 37 prevent the hub plate 22 from rotating about the common axis 30 relative to the bottom plate 15. This feature insures that the telescope 10 is firmly secured against rotation about the axis 30 or about a vertical axis unless adjustment of the telescope is desired. Such adjustment of the telescope about a vertical axis is accomplished by means of a fine motion hand wheel 51 which has a knurled outer surface 52 and which has a shoulder 53 rotatable upon an annular bearing 54 resting upon the hub plate 22.

A top plate 55 is secured to the hub plate 22 by means of a threaded element 56 having an enlarged cylindrical portion 57 which abuts tightly against the top plate 55 and a head 60. The element 56 extends through a Teflon bushing 61 and has its threaded portion 62 threaded into the top plate 55. In this manner, the inwardly projecting portion 65 of the hand wheel 51 is firmly retained between the hub plate 22 and the top plate 55 yet the top plate is rotatable relative to the hub plate 22 by member 56 roating in bushing 61.

Figure 3:
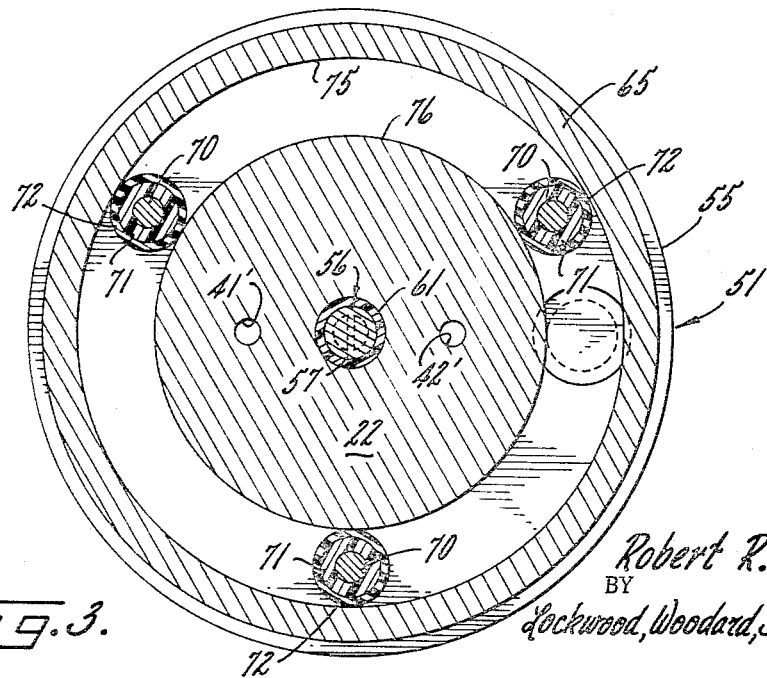
FIG. 3 is a horizontal section taken along the line 3—3 of FIG. 2 in the direction of the arrows.

Referring also to FIG. 3, three downwardly projecting studs 70 are fixed within and extend from said top plate 55 at 120° angularly spaced locations about the common axis 30 and have rollers 71 rotatably received thereon, said rollers 71 having annular rubber-or-the-like friction members 72 thereabout. The rollers 71 are positioned between the hand wheel 51 and the hub 22 and have their friction portion 72 engaging both the inner surface 75 of the portion 65 and the outer surface 76 of the hub plate 22.

It can be appreciated that as the hand wheel 51 is rotated about the axis 30 a single revolution, the studs 70 of the rollers 71 rotate only approximately half a revolution so that the top plate 55 with its telescope 10 mounted thereon will only move through half a revolution. Thus, the above arrangement provides a fine motion for bringing the telescope precisely on a target. Annular bearings 54 and 80 are received between the top plate 55 and the projection 65 and between the projection 65 and the hub plate 22, respectively, and permit relatively friction free rotation of the top plate 55, the fine motion wheel 51 and the hub plate 22 relative to one another. The bearing 80 is retained between the wheel 51 and the top plate 55 by a shoulder 79.

A liquid and air containing glass vial 85 is fixed within an aperture 86 within the top plate 55. The vial 85 has a part-spherical upper surface 87 upon which is inscribed a circle 90 (FIG. 1). The vial 85 is fixed in position by suitable plastic 91 filling the aperture 86 beneath the vial 85. As can be seen in FIG. 1, the aperture 86 opens through the top of the top plate 55. The top plate has an annular inwardly projecting shoulder 92 against which the vial 85 is fixedly maintained by the plastic mounting material 91. The bubble 95 within the vial when positioned directly in the center of the circle 90 indicates the level condition of the top plate 55. In other words, the vial with its circle 90 is so adjusted in the top plate 55 that when the bubble 95 is in the center of the circle 90, the telescope 10 is positioned within the given limits of the compensator whereby the compensator provides a level line of sight for the telescope.

The telescope 10 includes a housing 100 which has an upwardly opening channel shape and extends substantially the length of the telescope. The housing 100 is fixed to the top plate 55 by means of screws 101. At the forward end of the housing 100, there is fixed a wedge window-supporting element 102, this element preferably being welded to the channel 100. At the rearward end of the channel 100, there is secured an eye piece supporting element 105. The elements 102, 105 and the channel 100 together with a dust cover 106 close in the optical lenses, prisms and other optics of the telescope and protect them from damage by dust and dirt which is present under the operating conditions of the telescope.

The dust cover 106 is secured to the channel 100 and elements 102 and 105 by suitable adhesive sealant such as, for example, GE RTV silicone rubber adhesive sealant. The dust cover 106 is provided with a plurality of down-turned tabs 107 which accurately position it so as to close the top of the telescope channel 100. The wedge window-supporting element 102 has a cylindrical aperture 110 therethrough and has a window retainer 111 secured thereto by means of capstan screws 112. Received between the window retainer 111 and the element 102 is the wedge window 115 which preferably has a sufficient taper to raise or lower the line of sight of the telescope through an angle of one degree. This raising or lowering of the line of sight is, of course, accomplished by rotating the wedge window 115 about the axis of its generally cylindrical shape after first releasing the screws 112. The screws 112 are then tightened to retain the wedge window in the position to which it is adjusted.

The critical optics of the level include an objective lens assembly 120, a light stop 121, a focus lens assembly 122 and the automatic compensator assembly 123. All of the critical optics are shock mounted by means of blocks 125 and 126 upon hard rubber shock mounts 130 and 131 with screws 132 and 135 extending through the blocks 125 and 126 and threaded into the channel 100. Extending through the blocks 125 and 126 is a pair of elongated rods 136 and 137. Setscrews 139 are used to fix the blocks 125 and 126 to the rods 136 and 137.

The objective lens assembly 120 is mounted upon the forward end of the rods 136 and 137 by an externally rectangular lens mount 140 with said lens mount being suitably fixed in the desired front-to-rear position along the axis 142 of the telescope by setscrews 141. The critical optics mounting block 125 also has an upstanding externally rectangular portion 143 which serves as a light stop and has an appropriately sized cylindrical opening 145 therethrough and coaxial with axis 142.

The focus lens assembly 122 includes a lens mount 150 having Teflon bearings secured thereto and slidably mounting the assembly 122 upon the rods 136 and 137. Fixed to the lens mount 150 is a rod 151 which extends through a Teflon bearing 152 in the light stop 121 and acts as a guide rod for the lens assembly as well as part of a means for moving the assembly 122 forwardly or rearwardly along the axis of the telescope. The focus lens 122 is movable in a fore-and-aft direction by an adjustment wheel assembly 160 (FIG. 5) which includes a rod 161 rotatably received within Teflon bearings 162 in the walls of the channel 100. On either side of the focus rod 151, there are located friction wheels 165 which are pressed against the focus rod by means of compression springs 166. Between the bushings 162 and the springs 166 are positioned metal washers 167. Fixed to the opposite ends of the rod 161 by suitable setscrews 170 are knurled wheels 171, said wheels having openings of polygonal cross section which receive the complementarily polygonal ends 168 of the rod 161.

The telescope can be focused by rotation of the wheels 171 which causes rotation of the rod 161 with its squared portions 172. The squared portions 172 complement respective squared internal recesses in the friction wheels 165 whereby rotation of the rod 161 also rotates the wheels 165. Since the friction wheels are pressed against the rod 151 by the springs 166, the focus rod is moved and the focus lens assembly 122 is moved to the desired focusing position. In the case that the wheels 171 are forcibly turned after the focus lens has moved into engagement with the block 126 or at the other end of its travel into engagement with the compensator assembly 123, the friction wheels 165 will slip and will thereby prevent damage to the apparatus.

The compensator assembly 123 is shown in greater detail in FIGS. 7 and 8 and includes a front compensator mount 180 and a rear compensator mount 181, each of which is mounted upon the rods 136 and 137. The compensator assembly is fixed at a desired position along the axis of the telescope by setscrews 182 engaging the rods 136 and 137 and extending through the front compensator mount. Fixed to the top of the front and back compensator mounts by means of screws 186, 187 and 188 is a top plate 185. The screw 186 also secures in position a limit 190 for the compensator prism assembly 200.

The compensator prism assembly 200 is cemented at 201 between prism mount elements 202 and 203 which are secured together by the threads 205 of a limit member 206 and also by screws 208 threaded into internally threaded cylinders 209, said cylinders 209 spacing the members 202 and 203 apart. A limit member 207 is threaded at 205' and is screwed into the prism mount element 202. The top plate 185 also has secured thereto depending limit members 210 each of which is formed with a circular opening 211 slightly larger than the size of the enlarged portions 212 and 213 of the limit members 206 and 207. The members 206 and 207 are located at generally the center of pivoting of the prism assembly 200 and, therefore, do not normally engage the depending members 210. In the case, however, that the telescope is tilted or overturned, the limit members 206 and 207 can engage the members 210 to prevent damage to the prism assembly and compensator. The limit members 210 are mounted on the top plate 185 by screws 208.

Fixed to the back compensator mount 181 is a rod 220 which has secured thereto by suitable adhesive a wire 221. The other end 222 of the wire is received within suitable adhesive in the end of the member 207. The wire 221 which easily and resiliently twists with the movement of the prism assembly 200 prevents the prism assembly from moving from side to side (left to right as viewed in FIG. 8) during operation of the telescope and during operation of the automatic compensator and also prevents damage to the prism assembly 200 when the telescope is roughly handled or overturned, etc.

The actual compensating action of the prism assembly is effected by means of cross band assemblies 230. The cross band assemblies 230 include mounting blocks 231 which are secured to the top plate 185 by suitable adhesive 232. The cross band assemblies each further include a lower mounting block 235 and two cross bands 233 and 234. Preferably, the bands 233 and 234 are cast with their opposite ends in the mounting blocks 231 and in mounting blocks 235 which are secured to the opposite sides of the prism assembly 200 by adhesive 236. It can be appreciated that when the forward end of the telescope drops, the bands 234 which are connected to the most rearward portion of the blocks 231 will lift the forward end of the blocks 235. Each of the blocks 235 is fixed to a respective one of the members 202 and 203. Thus, raising of the forward end of blocks 235 also raises the forward end of the prism assembly so as to bring the line of sight of the telescope back to the same level condition as prior to the movement.

Referring to FIG. 7, the path of a ray of light through the compensator prism assembly is illustrated at 240 with the light first being reflected off the surface 241 of the prism 242 striking the surface 245 of the prism 246 and then striking the surface 247 of the prism 246. It will be noted from FIG. 8 that the surface 245 of the prism 246 is V-shaped and formed at an angle of precisely 90 degrees which reverses the image left for right. In other words, the ray 240 as it moves up to strike the surface 245 hits first one side of the surface, then bounces over, strikes the other side and moves downwardly as indicated by the numeral 240 in FIG. 8.

The present device without the compensator assembly 123 is a celestial telescope which produces an inverted image. The compensator 123 inverts that image top for bottom and right for left so as to produce the identical image normally seen by the eye but magnified by the magnifying portions of the telescope.

A piston 250 is fixed to the rear compensator mount 181 by a rod 251 and setscrew 252. The piston moves within a chamber 255 in a depending element 256 secured to the bottom of the prism assembly 200. The purpose of the piston and chamber is to damp the movement of the prism assembly 200 as it compensates. This damping is accomplished by the movement of air past the piston into and out of the chamber 255. As can be seen in FIG. 7, the chamber 255 has a curved shape which is generally cylindrical yet with the axis of the cylinder curved about the axis of pivoting of the prism assembly which is approximately at the axis of members 206 and 207.

It should be noted that the compensator of the present invention is easily adjustable to provide a greater amount or a lesser amount of compensation in order to accurately set the compensator for maintaining an accurate level line of sight. In other words, the compensator does have the capability of being adjusted to compensate greater than one to one. If the space between the upper connection of the bands 233 and 234 to the blocks 231 is decreased, or if the spacing between the connection of the bands 233 and 234 to the blocks 235 is increased or if the center of mass of the prism assembly 200 is lowered, then the degree of compensation for a given movement or tilt of the telescope is decreased. Of course, any opposite correction to that above indicated increases the degree of compensation. It should be mentioned that the center of mass of the prism assembly is positioned just under the axis of pivoting which as mentioned is approximately at the axis of members 206 and 207. Also, the bands 233 and 234 have a certain amount of resistance to bending which also plays a part in the compensating action. In order to provide the most accurate compensation throughout the entire range or between the limits within which the compensator can compensate, the three above variables are chosen approximately as illustrated and stated to provide the most accurate results.

The reticle or cross hairs 260 of the telescope are located between the lenses 261 of the ocular and may be placed there by photographic emulsion process or suitable equivalent. The lenses 261 are fixed within a generally cylindrical mounting element 262 which is, in turn, mounted within an aperture 263 through the rear compensator mount 181.

The eye lens 265 is mounted within the adjustable eye piece 266. The eye piece 266 can be adjusted to any desired position by rotation thereof causing member 267 riding within a thread 270 in the external cylindrical surface 271 of the eye piece to move the eye piece longitudinally of the telescope. The member 267 is pressed into position by a compression spring 273 received between the member 267 and a setscrew 272. Thus, should the eye piece 267 be struck in operation so as to drive it into the telescope, the member 267 will merely ride up out of the thread 270 and no damage to the threads results.

The housing 100 is provided with a generally channel-shaped cover 300 which is secured to the housing by suitable screws 301.

As indicated above, the operation of the telescope 10 is pretty much identical to the conventional celestial telescope with the exception that the light rays are acted upon by the compensator assembly in their path through the telescope. Thus, the compensator corrects the light rays and causes them to be redirected in such a way that the image seen through the eye lens 265 is the same image as would be seen were the telescope actually level. The cross hairs 260, of course, remain on the axis of the telescope since they are fixedly mounted relative to the rods 136 and 137 and the image is, in effect, appropriately moved to the cross hairs.

In order to set up the automatic level of the present invention for operation, the base bottom plate 15 is secured to the tripod screws 17. The bubble 95 is then leveled in the following manner. The projections or lugs 27 and 28 of the wedges are positioned oppositely of one another and are both turned to a position where both lugs are projecting in a direction perpendicular to the direction in which the bubble is out of level. Both lugs are then moved at the same time in the direction in which it is desired for the bubble to move. The latter lug movement is continued until the bubble is centered in the circle 90.

When the bubble 95 has been so centered, the automatic level is ready for conventional operation. Of course, the bridges 40 and 41 as well as the springs 36 and 37 keep the members 15 and 22 in fixed angular position relative to one another. Since the telescope is firmly mounted upon the top plate 55 and the top plate 55 can be rotated relative to the hub plate 22 only by rotating of the hand wheel 51, the telescope is firm and steady. When it is desired to sight on an object, the hand wheel 51 is rotated in order to bring in the telescope on the object.

It will be evident from the above description that the present invention provides an improved level capable of being quickly and accurately adjusted to a horizontal line of sight and capable of automatically maintaining the horizontal line of sight. In other aspects of operation, the present level is used in the same manner as conventional levels.

It will also be appreciated from the above description that the present invention provides a level incorporating improved means for bringing the level into adjustment. It can also be seen from the above that the present invention provides an automatic level which is relatively shock resistant and that shocks and jolts do not damage the critical optics of the level.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An automatic level comprising an optical system including a compensator adapted to return the line of sight of the optical system to the level within given limits, means for adjusting said optical system to an approximately level condition within said limits comprising a top element upon which said system is mounted, means for indicating when said optical system is within said given limits, a fixed lower element, a pair of stacked wedges rotatably mounted between said top and bottom elements for rotation about a common axis, said top element resting upon said wedges and being universally tiltable by rotation of said wedges relative to one another and relative to said bottom element, interlocking bridges one fixed to said fixed lower element and one fixed to said top element, a compression spring received between said bridges and urging them apart and urging said top element, wedges and fixed lower element together, and a pair of elongated stabilizer springs each having one end fixed to one bridge and the other end to the other bridge and resisting relative rotation between said top element and said fixed lower element.

2. An automatic level comprising an optical system including a compensator adapted to return the line of sight of the optical system to the level within given limits, means for adjusting said optical system to an approximately level condition within said limits comprising a top member upon which said system is mounted, means for indicating when said optical system is within said given limits, a fixed lower element, a hub element having a cylindrical outer periphery, a pair of stacked wedges rotatably mounted between said hub and bottom elements for rotation about a common axis, said top member resting upon said wedges and being universally tiltable by rotation of said wedges relative to one another and relative to said bottom element, interlocking bridges one fixed to said fixed lower element and one fixed to said hub element, a compression spring received between said bridges and urging them apart and urging said hub element, wedges and fixed lower element together, and a pair of elongated stabilizer springs each having one end fixed to one bridge and the other end to the other bridge and resisting relative rotation between said hub element and said fixed lower element, means securing said top element to said hub element for rotation relative to one another, a hand wheel having an inwardly extending annular flange received between said top element and said hub element, said flange having an inner cylindrical periphery, a plurality of rollers rotatably mounted on said top element with their peripheries bearing against the inner periphery of said flange and the outer periphery of said hub element whereby a single rotation of said hand wheel rotates said top plate a lesser amount.

3. A compensator for an automatic level comprising a prism assembly having a first reflecting surface extending upwardly and rearwardly and reflecting a horizontal light ray upwardly and rearwardly, said prism assembly having a roof which acts as a second reflecting surface and includes two surfaces at right angles to one another for reversing the image side for side, said roof being arranged with the two surfaces thereof extending from front to rear, said prisms having a further reflecting surface extending downwardly and rearwardly and reflecting the light ray from said roof back to the horizontal, means supporting the compensator and including a pair of elements fixed relative to said level and each having a pair of bands hanging downwardly therefrom, a first band of each pair being secured to said fixed elements forwardly of the attachment of the second band of each pair to said fixed elements, each pair of bands extending downwardly and crossing and secured to said prism assembly with the second band being secured to said prism assembly forwardly of the attachment of said first band to said prism assembly whereby downward tilting of the forward end of said telescope causes upward tilting of the forward end of said prism assembly and upward tilting of the forward end of said telescope causes downward tilting of the forward end of said prism assembly, said prism assembly generally being swingable on said bands about a transverse axis, limit members fixed to said prism assembly and extending oppositely therefrom at the axis of pivoting thereof, depending members fixed to said level and having circular apertures receiving said oppositely projecting limit members, said circular apertures being larger than said oppositely projecting limit members and normally having said limit members positioned coaxially of said circular apertures, said depending members acting to limit the movement of said oppositely projecting limit members when said compensator is overturned or tilted to a large degree, an elongated wire coaxially positioned relative to said axis of swinging and fixed at one end to one of said limit members and at the other end relative to said level, said wire being resiliently deformable in torsion to permit swinging of said prism assembly yet preventing transverse swinging of said prism assembly on said bands relative to said level.

4. An automatic level comprising a housing, a round wedge window mounted at the forward end of said housing, said wedge window being rotatable about its axis to a desired position, clamping means for locking said wedge window against said housing, a pair of blocks, resilient shock absorbing elements between said blocks and said housing, screws extending through said blocks and resilient elements and fixing said blocks to said housing, a pair of rods fixedly received through said blocks and extending from front to rear in said housing, an objective lens fixedly mounted on said rods to the rear of said wedge window, a light stop fixedly mounted on said rods to the rear of said objective lens, a negative focusing lens mounted on said rods to the rear of said light stop for slidable movement longitudinally of said rods, said focusing lens having a guide rod fixed thereto and slidably received through said light stop, a compensator prism assembly mounted on said rods to the rear of said focusing lens, a field lens mounted on said rods to the rear of said prism assembly, and an eye lens mounted at the rearward end of said telescope.

5. An automatic level comprising a housing, a round wedge window mounted at the forward end of said housing, said wedge window being rotatable about its axis to a desired position, clamping means for locking said wedge window against said housing, a pair of blocks, resilient shock absorbing elements between said blocks and said housing, screws extending through said blocks and resilient elements and fixing said blocks to said housing, said resilient shock absorbing elements also being between said screws and said blocks, a pair of rods fixedly received through said blocks and extending from front to rear in said housing, an objective lens fixedly mounted on said rods to the rear of said wedge window, a light stop fixedly mounted on said rods to the rear of said objective lens, a negative focusing lens mounted on said rods to the rear of said light stop for slidable movement longitudinally of said rods, said focusing lens having a guide rod fixed thereto and slidably received through said light stop.

6. An automatic level comprising a housing, a round wedge window mounted at the forward end of said housing, said wedge window being rotatable about its axis to a desired position, clamping means for locking said wedge window against said housing, a pair of blocks, resilient shock absorbing elements between said blocks and said housing, screws extending through said blocks and resilient elements and fixing said blocks to said housing, a pair of rods fixedly received through said blocks and extending from front to rear in said housing, an objective lens fixedly mounted on said rods to the rear of said wedge window, a light stop fixedly mounted on said rods to the rear of said objective lens, a negative focusing lens mounted on said rods to the rear of said light stop for slidable movement longitudinally of said rods, said focusing lens having a guide rod fixed thereto and slidably received through said light stop, a compensator assembly mounted on said rods to the rear of said focusing lens and including a field lens, an eye piece having an external cylindrical shape with a helical indented thread therein, said eye piece being slidably received in the rearward end of said housing for front to rear movement in said housing, a piston reciprocably mounted in said housing and engageable with said thread, compression spring means acting between said housing and said piston and causing said piston to yieldably engage said thread, said eye piece being rotatable in and out of said housing with said piston in said thread and capable of overriding said thread without damage either to said thread or piston.

7. An automatic level comprising a housing, a round wedge window mounted at the forward end of said housing, said wedge window being rotatable about its axis to a desired position, clamping means for locking said wedge window against said housing, a pair of blocks, resilient shock absorbing elements between said blocks and said housing, screws extending through said blocks and resilient elements and fixing said blocks to said housing, a pair of rods fixedly received through said blocks and extending from front to rear in said housing, an objective lens fixedly mounted on said rods to the rear of said wedge window, a light stop fixedly mounted on said rods to the rear of said objective lens, a negative focusing lens mounted on said rods to the rear of said light stop for slidable movement longitudinally of said rods, said focusing lens having a guide rod fixed thereto and slidably received through said light stop, said guide rod extending front to rear, a pair of friction wheels on opposite sides of said guide rod, a shaft rotatably mounted on said housing and having a polygonal external shape for rotating said friction wheels, knobs fixed to the opposite ends of said shaft for the rotation thereof, and spring means acting between said housing and said friction wheels and urging them against said guide rod whereby rotation of said knobs moves said objective lens, a compensator assembly mounted on said rods to the rear of said focusing lens and including a field lens, and an eye lens mounted at the rearward end of said level.

References Cited

UNITED STATES PATENTS

| 2,726,834 | 12/1955 | Hoge | 248—180 |
| 2,779,231 | 1/1957 | Drodofsky | 88—1 |
| 3,220,297 | 11/1965 | Baker et al. | 88—1 |

FOREIGN PATENTS

| 774,437 | 5/1957 | Great Britain. |
| 628,040 | 11/1961 | Italy. |

JEWELL H. PEDERSEN, *Primary Examiner.*

O. B. CHEW, *Assistant Examiner.*